(12) United States Patent
Broadhead et al.

(10) Patent No.: US 6,983,971 B2
(45) Date of Patent: Jan. 10, 2006

(54) MID STRUCTURAL MODULE

(75) Inventors: Douglas G. Broadhead, Brampton (CA); William J. Harney, Toronto (CA); Tomislav Jankovic, Toronto (CA); Timothy F. O'Brien, White Lake, MI (US); Manfred Fritsch, Highland, MI (US); Gordon Liu, Windsor (CA)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 10/472,923

(22) PCT Filed: Mar. 26, 2002

(86) PCT No.: PCT/CA02/00418

§ 371 (c)(1),
(2), (4) Date: Sep. 25, 2003

(87) PCT Pub. No.: WO02/076792

PCT Pub. Date: Oct. 3, 2002

(65) Prior Publication Data
US 2004/0090086 A1     May 13, 2004

Related U.S. Application Data

(60) Provisional application No. 60/278,912, filed on Mar. 26, 2001.

(51) Int. Cl.
*B62D 25/00* (2006.01)

(52) U.S. Cl. .............................. 296/24.44; 296/193.04

(58) Field of Classification Search ............. 296/24.44, 296/24.45, 191, 193.04, 193.08
See application file for complete search history.

(56) References Cited

U.S. PATENT DOCUMENTS

| 1,220,999 | A | | 3/1917 | Booth |
| 3,590,936 | A | | 7/1971 | Wessells, III et al. |
| 4,634,174 | A | * | 1/1987 | Kamiya ................... 296/24.44 |
| 5,174,628 | A | | 12/1992 | Hayatsugu et al. |
| 5,350,214 | A | * | 9/1994 | Yamauchi et al. .......... 296/204 |
| 5,735,564 | A | | 4/1998 | Coogan |
| 5,881,458 | A | | 3/1999 | Wolf et al. |
| 5,882,064 | A | | 3/1999 | Emmons |
| 5,921,605 | A | * | 7/1999 | Musukula et al. ............ 296/63 |
| 6,296,300 | B1 | | 10/2001 | Sato |
| 6,354,623 | B1 | * | 3/2002 | Delmastro ................... 296/70 |

FOREIGN PATENT DOCUMENTS

| DE | 19741628 A1 | * | 3/1999 |
| FR | 2779403 | * | 4/1998 |
| JP | 1-186481 | | 7/1989 |
| JP | 3-0118279 | | 5/1991 |
| JP | 3-157278 | | 7/1991 |

* cited by examiner

*Primary Examiner*—Jason Morrow
(74) *Attorney, Agent, or Firm*—Clark Hill PLC

(57) ABSTRACT

A vehicular module (20) secures a plurality of components to a motor vehicle (10) having a frame (29). The vehicular module (20) includes a tray (22) and a support member (24) that is fixedly secured to the tray (22). The tray (22includes a plurality of receiving apertures for mounting a plurality of components thereto. The support member (24) engages the frame (29) of the motor vehicle (10) to support the tray (22) and provide structural integrity to the vehicle frame (29). The module (20) may be pre-assembled prior to installation to the vehicle frame (29).

12 Claims, 5 Drawing Sheets

US 6,983,971 B2

MID STRUCTURAL MODULE

RELATED APPLICATION

This application claims priority to and all the benefits of U.S. Provisional Application No. 60/278,912, filed on Mar. 26, 2001.

FIELD OF THE INVENTION

The invention relates to a vehiclular mid structural module. More particularly, this invention relates to a vehicular module incorporating a tray assembly for securing a plurality of components to a mid region of the frame of a motor vehicle.

BACKGROUND OF THE INVENTION

According to conventional motor vehicle construction, multiple components are installed to the frame assembly separately of one another in the rear interior area of a vehicle passenger compartment. These components are typically packaged and shipped separately from various suppliers to a vehicle assembly site.

In particular, the installation of various vehicle components into the rear interior area of the motor vehicle can be difficult due to the needs for installing individual components in confined and restricted spaces. Individual installation of these components at a main vehicular assembly line slows the vehicle construction, is time-consuming, and is costly. As a result, there is a need for a more efficient system for assembly of the rear interior portion of the motor vehicle.

In many instances, a rear tray is a structural component of the motor vehicle. Not only does the tray provide a surface to which various components may be secured, it also adds to the structural integrity of the frame. It does so by maintaining the rear windshield in its proper position. To fulfill such requirements, the tray must be structurally reinforced. Structural reinforcement is accomplished by using tens of sheet metal pieces that are bonded or otherwise secured to the tray. This adds extra weight to the motor vehicle.

SUMMARY OF THE INVENTION

A vehicular mid structural module secures a plurality of components to a motor vehicle frame and adds structural integrity thereto. The vehicular assembly includes a tray having a bottom surface, a top surface, a front edge, a back edge, and a pair of sides extending between the front edge and the back edge. The tray includes a plurality of receiving apertures for mounting a plurality of components thereto. The vehicular assembly also includes a support member that is fixedly secured to the tray. The support member extends between the tray and the frame of the motor vehicle to support and strengthen the tray.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
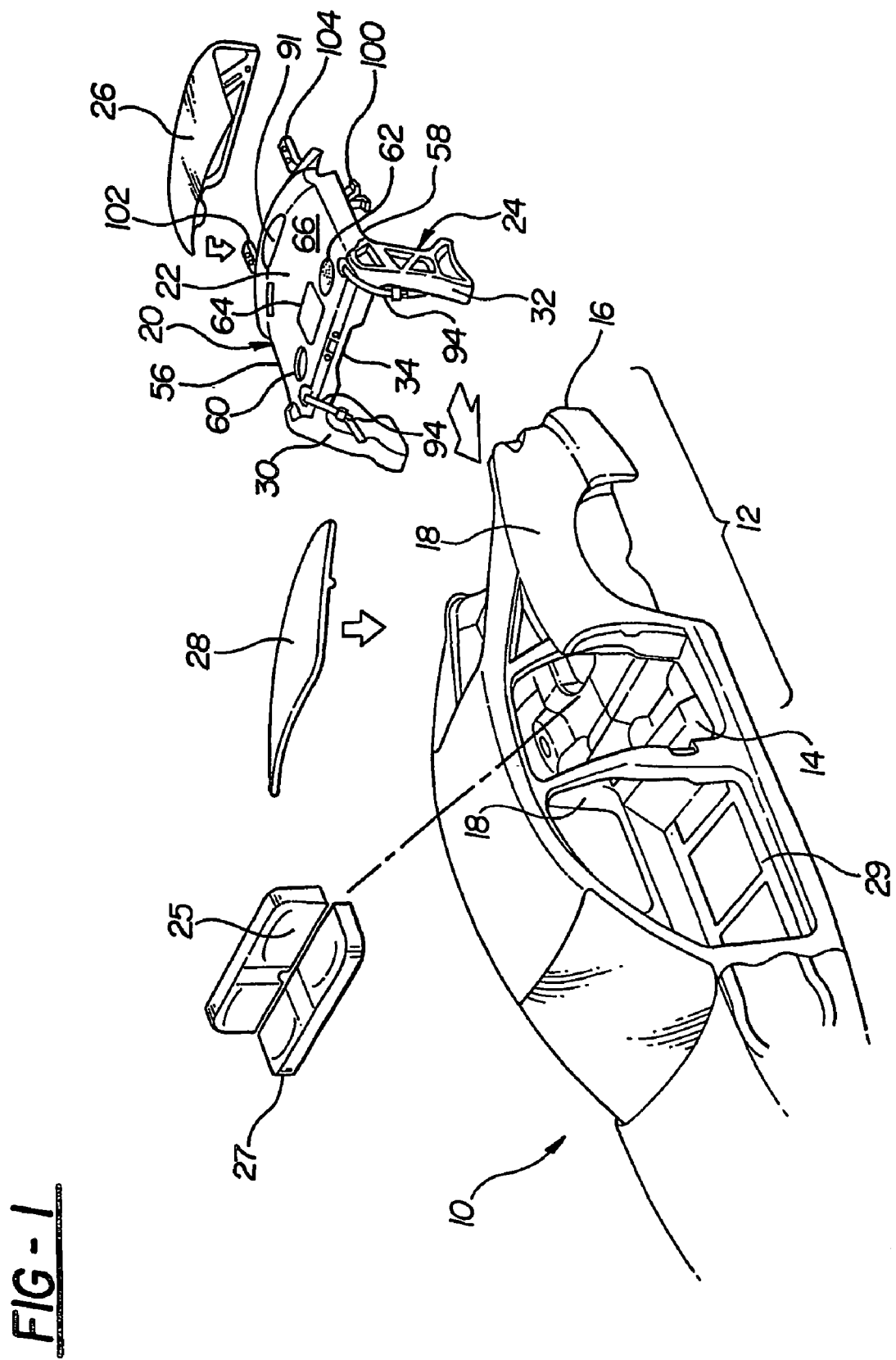
FIG. 1 is a perspective view of a motor vehicle including a module according to one embodiment of the invention, a decklid, and a rear windshield.

Referring to FIG. 1, a motor vehicle is generally shown at 10. A rear portion 12 of the vehicle 10 extends between a rear seating area 14 and a rear bumper 16, and is bounded by a pair of sidewalls (B or C pillar regions) 18 extending between the rear seating area 14 and the rear bumper 16. A vehicular module, generally indicated at 20, includes a tray 22 and a support member 24. The tray 22 extends between the sidewalls 18 upon installation inside the vehicle 10. The tray 22, along with the support member 24, supports a later-installed seat back portion 25 of a seat structure 27, which is positioned over a vehicle frame 29. Optionally, the seat back portion 25 of the seat structure 27 may be secured directly to the support member 24 before the tray 22 and the support member 24 are installed inside the vehicle 10. The tray 22 and the support member 24 also serve to increase vehicle stiffness against side impacts. A decklid 26 and a rear windshield 28, both of which are mounted to the tray 22 (as described in further detail below), are also shown.

Figure 2:
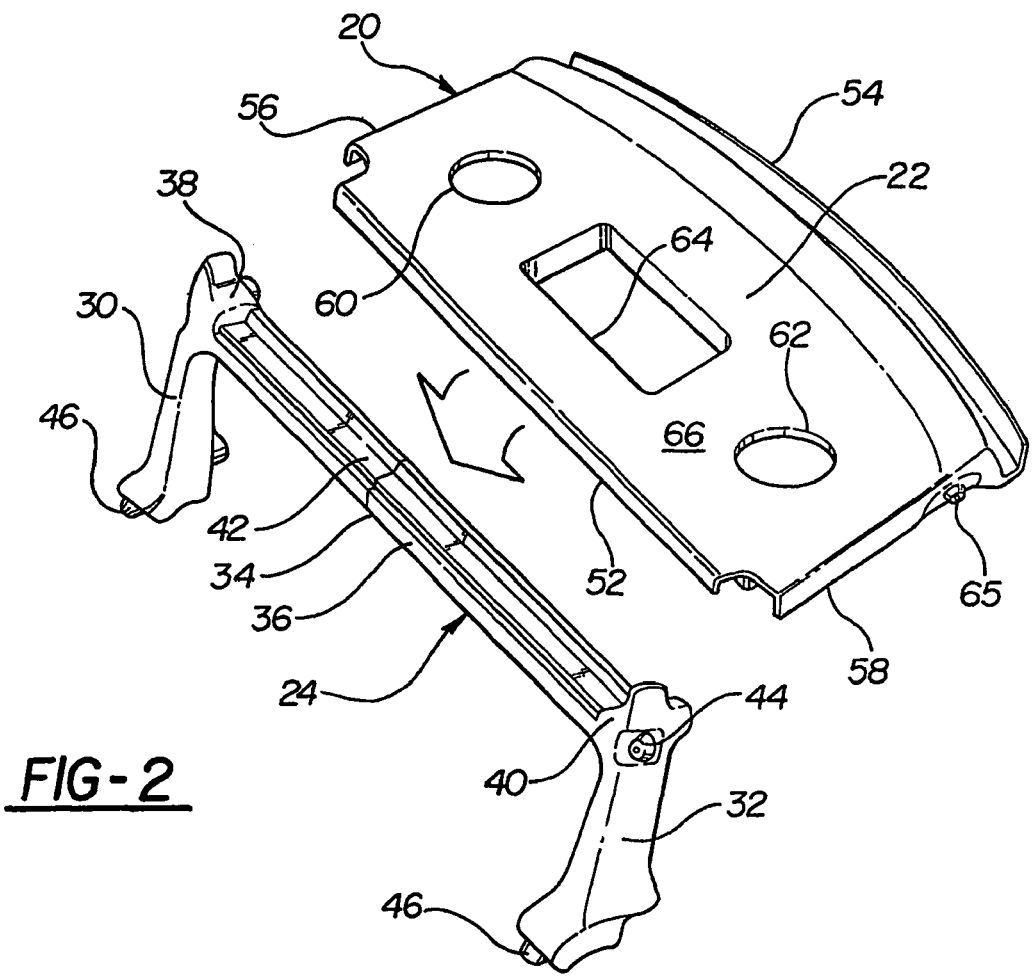
FIG. 2 is a perspective view of the module according to one embodiment of the invention.
Figure 5:
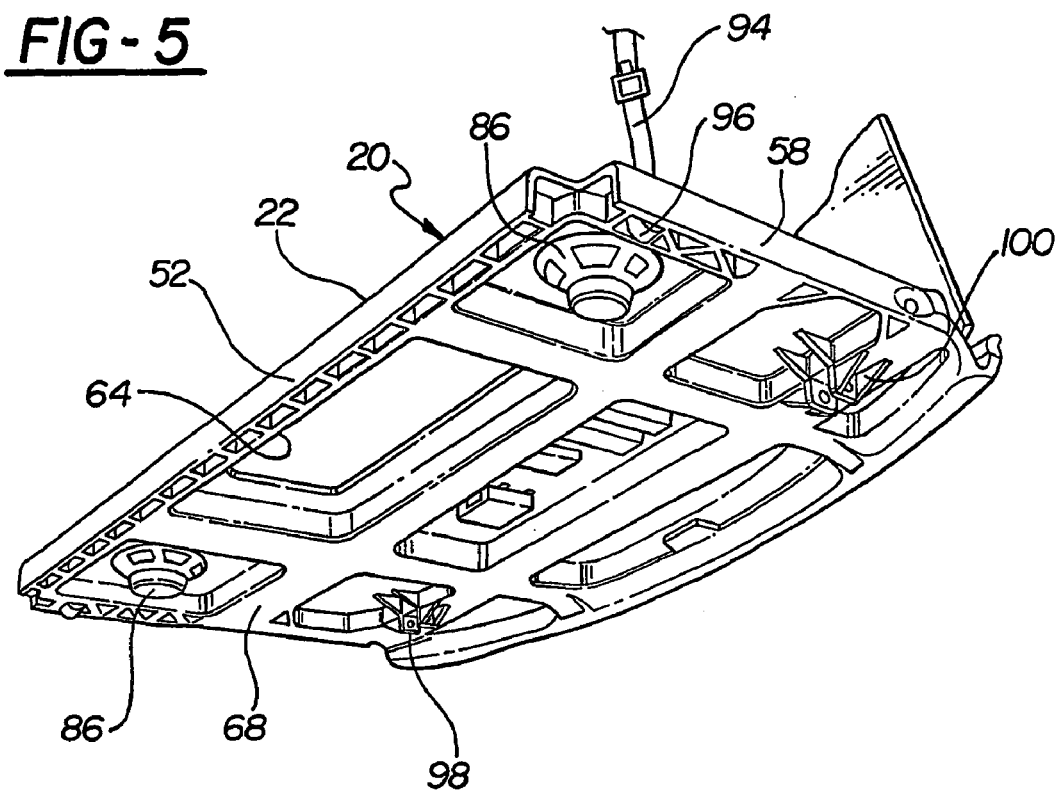
FIG. 5 is a bottom view of the module of one embodiment of the invention.

Referring to FIG. 2, the support member 24 is generally an inverted U-shape and includes a pair of side support arms 30, 32 and a top support member 34 extending therebetween in the bight of the U. The top support member 34 defines a middle segment 36 and a pair of top member ends 38, 40. The middle segment 36 defines a recessed portion 42 extending along the length of the top support member 34. The recessed portion 42 is formed to complementarily receive the tray 22 for attachment thereto. The support member 24 and the tray 22 may be bonded, fastened or otherwise attached as known by those skilled in the art. An upper mount 44 and a lower mount 46 are provided on each of the top member ends 38, 40 for attachment of the support member 24 to the sidewalls 18 of the vehicle 10. The upper mount 44 may also support a rear speaker assembly, generally indicated at 85 (as shown in FIG. 5).

Figure 3:
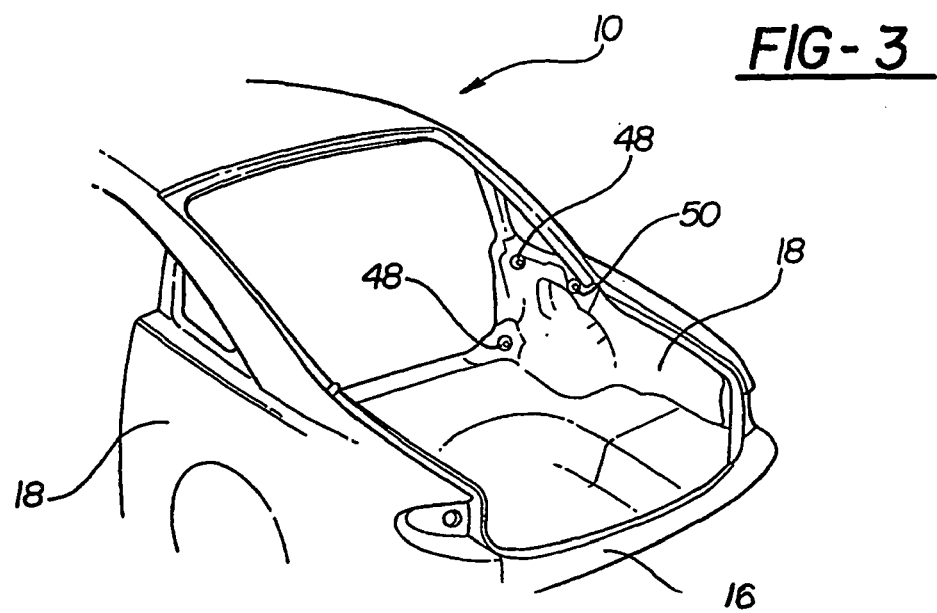
FIG. 3 is a rear perspective view of the motor vehicle and a plurality of receiving apertures formed along a sidewall thereof.

The tray 22 includes a generally L-shaped front edge 52, a back edge 54, and a pair of side edges 56, 58 extending between the front edge 52 and the back edge 54. The tray 22 further defines a pair of generally circular-shaped apertures 60, 62 therethrough for receiving a speaker (as seen in FIG. 3). The tray 22 also defines a generally rectangular-shaped cavity 64 therethrough for receiving an additional vehicle component. The tray 22 further includes a mount 65 on each of the sides 56, 58 for mounting the tray 22 within the apertures 50.

Referring to FIG. 3, a plurality of support member-receiving apertures 48 and a tray-receiving aperture 50 are formed in the opposite sidewalls 18. It will be appreciated that the number of upper 44 and lower 46 mounts and the number of complementary receiving apertures 48, 50 may vary depending on the design of the tray 22 and the support member 24.

Figure 4:
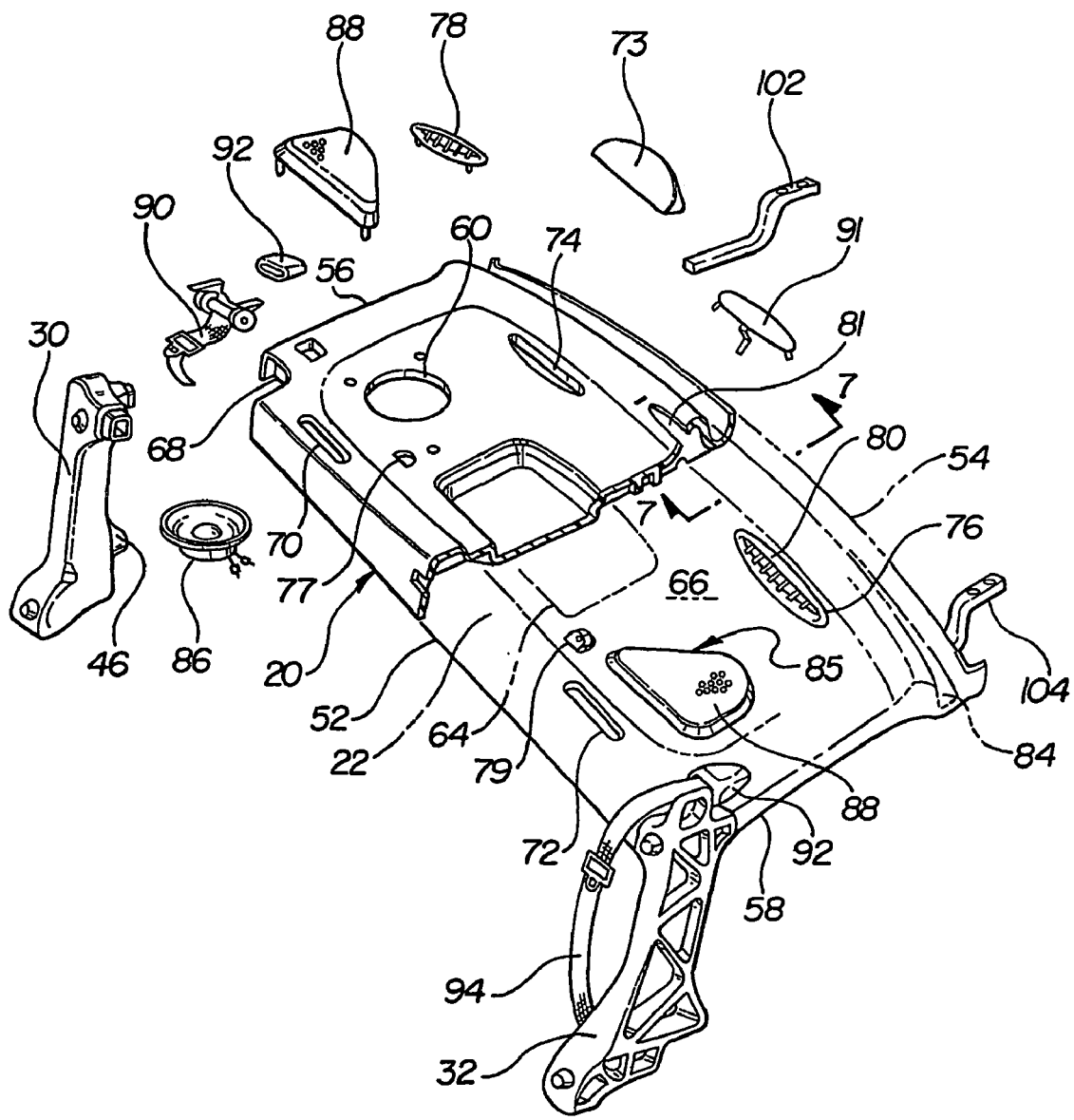
FIG. 4 is a partially exploded, perspective view of the module of one embodiment of the invention.

Referring to FIG. 4, the tray 22 has a top surface 66 and an underside 68. The underside defines a series of reinforcing or structural ribs integrally molded or formed therein. The tray 22 defines a pair of head restraint mounts 70, 72 adjacent to the front edge 52 thereof. Each of the head restraint mounts 70, 72 are shaped to receive a head restraint 73 therein. The tray 22 also includes a pair of oval-shaped mounting apertures 74, 76 adjacent the back edge 54 thereof for receiving a plurality of air ventilation outlets 78, 80. In addition, the tray 22 includes a center mounting aperture 81 for receiving rear windshield mount 82 adjacent to the back edge 54 for supporting the rear windshield 28. The tray 22 defines a drainage trough 84 adjacent the back edge 54 thereof. The drainage trough 84 is formed to retain any water that collects therein upon opening of the decklid 26. The tray 22 also defines a plurality of semi-circular shaped apertures 77 for receiving additional vehicle components, such as a child seat restraint attachment member 79.

Each of the plurality of circular-shaped apertures 56, 58 formed through the tray 22 receives a speaker assembly 85 including a subwoofer 86 and a grill cover 88. The plurality of components, including the head restraints 73, the air ventilation outlets 78, 80, the child seat restraint attachment member 79, the speaker assembly 85, and a center high mounted stop light (CHMSL) support 91, is secured to the tray 22 before installation of the tray 22 into the rear seating area 14 of the vehicle 10.

The side support members 30, 32 include a seat belt mechanism 90 having a seat belt guide 92 for aligning a seatbelt 94 as it slides therethrough bidirectionally. Referring to FIG. 5, a seat belt anchor 96 is formed at the bottom surface 68 of the tray 22.

Figure 6:
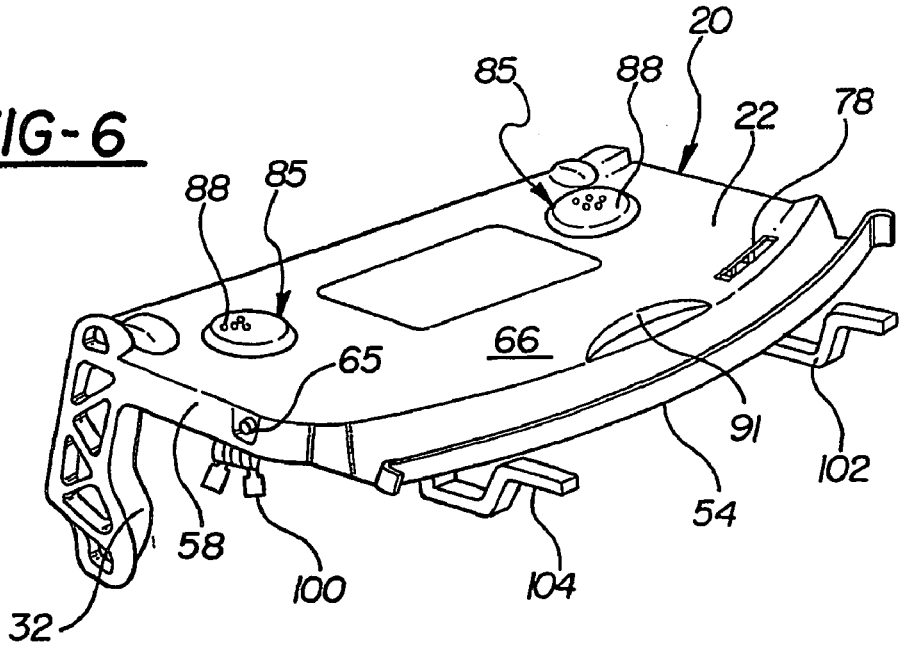
FIG. 6 is a rear perspective view of the module of one embodiment of the invention.

The bottom surface 68 of the tray 22 also includes a pair of hinge brackets 98, 100 extending downwardly therefrom. Referring to FIG. 6, a pair of generally S-shaped decklid hinges 102, 104 is mounted to the bottom surface 68 of the tray 22. The decklid 26 is pivotally secured to the decklid hinges 102, 104 for moving the decklid between an open and a closed position.

Figure 7:
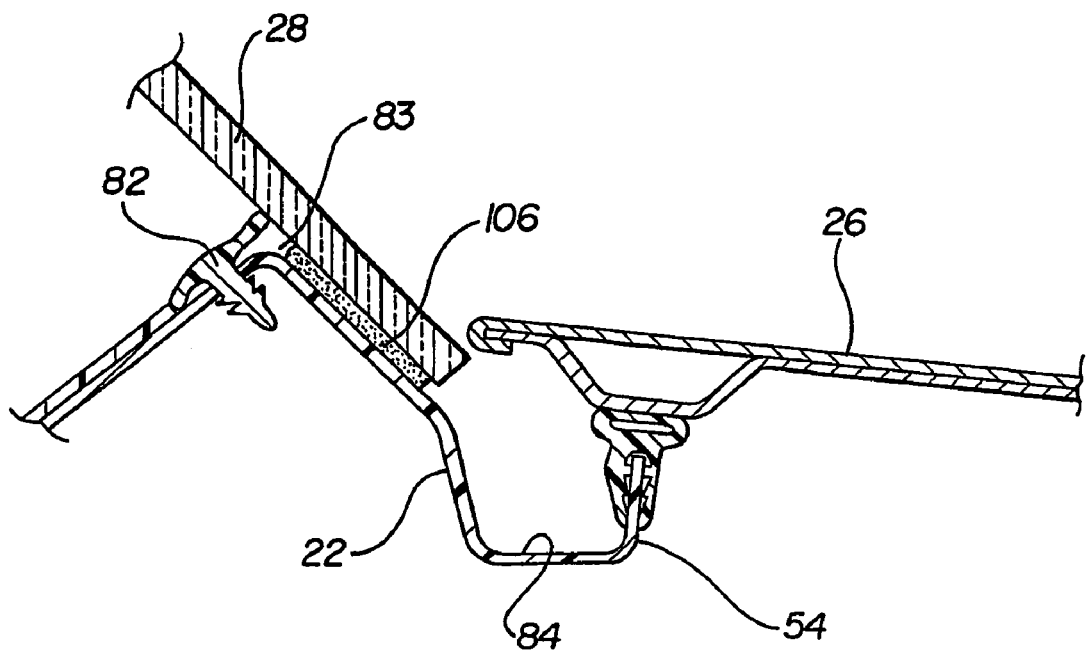
FIG. 7 is a cross-sectional view along lines 7—7 in FIG. 4.

Finally, referring to FIG. 7, the tray 22 includes a rear windshield mount 82 for mounting the rear windshield 28. In addition the back edge 54 of the tray 22 includes a seal member 106 extending along the length of the back edge 54. The seal member 106 extends within a channel 83 along a portion of the periphery of a trunk compartment.

The method for installing the vehicular module 20 to the rear portion 12 of the vehicle 10 begins with securing the plurality of components to the tray 22. The tray 22 includes a plurality of mounting members and receiving apertures for securing such vehicle components thereto. The tray 22 is secured to the support member 24. The step of attaching the tray 22 to the support member 24 can occur by molding the tray 22 to the support member 24. Before the final step of attaching the support member 24 to the rear portion 12 of the vehicle 10, the apertures 48 and apertures 50 must be formed in the B or C pillar region 18 of the vehicle 10. Finally, the support member 24 and the tray 22 are attached to the B or C pillar region 18 of the vehicle 10. The rear windshield 28 is mounted to the tray 22 and sealed against the seal 106 extending along the channel 83.

Alternatively, the step of attaching the support member 24 to the rear portion 12 of the vehicle 10 may be performed prior to the step of connecting the tray 22 to the support member 24. As a result, the tray 22 and the plurality of components attached thereto can be directly installed to the support member 22 of the vehicle 10.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A vehicular module for securing a plurality of components to a motor vehicle having a frame, said vehicular module comprising:
 a tray having a series of structural ribs on an underside thereof; and
 a support member having an inverted U shape and comprising a top member and two arms disposed at either end thereof, said support member fixedly secured to said underside of said tray, said support member attachable to the frame of the motor vehicle supporting said tray.

2. A vehicular module as set forth in claim 1 wherein said tray defines a plurality of head restraint mounts for receiving a respective plurality of head restraints.

3. A vehicular module as set forth in claim 2 wherein said tray has a channel extending transversely thereof for receiving a windshield therein.

4. A vehicular module as set forth in claim 3 wherein said channel includes a seal for sealing the windshield thereagainst.

5. A vehicular module as set forth in claim 3 further comprising a seat back mounted to said support member.

6. A vehicular module as set forth in claim 1 further comprising a vehicle component mounted to said tray, said vehicle component selected from a group comprising speakers, grill covers, head restraint mounts, seat belt guides, deck lid hinges, brake lights and child seat attachments.

7. A method for installing a vehicular module on a motor vehicle having a frame defining receiving apertures, the vehicular module including a tray, a support member having a top member and two side support arms therefrom in an inverted U shape, the method comprising the steps of:
 fixing the tray to the support member defining a vehicular module; and
 attaching the module to the frame by inserting mounts extending from the support arms into apertures in the frame of the motor vehicle.

8. A method as set forth in claim 7 including the step of securing a seat back to the support member prior to said attaching step.

9. A method as set forth in claim 8 wherein the step of fixing the tray to the top support member includes matingly engaging the tray with the top support member.

10. A method as set forth in claim 9 wherein the step of fixing the tray includes the step of bonding the tray to the top support member.

11. A method as set forth in claim 9 wherein the step of fixing the tray to the frame includes molding the tray to the top support member.

12. A method as set forth in claim 11 wherein the step of attaching the side support arms to the frame of the motor vehicle includes inserting upper and lower mounts into the receiving apertures of the frame.

* * * * *